(12) United States Patent
Zhan et al.

(10) Patent No.: US 11,862,039 B2
(45) Date of Patent: Jan. 2, 2024

(54) DEVICE FOR ANALOGUE MODELING EXPERIMENT OF GEOLOGICAL STRUCTURE UNDER HYPERGRAVITY FIELD OF LARGE-SCALE CENTRIFUGE

(71) Applicant: ZHEJIANG UNIVERSITY, Zhejiang (CN)

(72) Inventors: Liangtong Zhan, Zhejiang (CN); Chi Zhang, Zhejiang (CN); Jianxun Zhou, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 750 days.

(21) Appl. No.: 17/042,929

(22) PCT Filed: Apr. 2, 2019

(86) PCT No.: PCT/CN2019/080940
§ 371 (c)(1),
(2) Date: Sep. 29, 2020

(87) PCT Pub. No.: WO2020/098202
PCT Pub. Date: May 22, 2020

(65) Prior Publication Data
US 2021/0027662 A1 Jan. 28, 2021

(30) Foreign Application Priority Data
Nov. 13, 2018 (CN) .......................... 201811345344.0

(51) Int. Cl.
*G09B 23/40* (2006.01)
(52) U.S. Cl.
CPC .................................. *G09B 23/40* (2013.01)

(58) Field of Classification Search
CPC ... G01B 11/24; A63F 1/02; A63F 1/12; A63F 2001/022; A63F 2001/001;
(Continued)

(56) References Cited

U.S. PATENT DOCUMENTS 6,039,571 A 3/2000 Hughes
2023/0116319 A1* 4/2023 Wang ................. G01N 21/9515
356/237.1

FOREIGN PATENT DOCUMENTS

CN 102000539 A 4/2011
CN 102323138 A 1/2012
(Continued)

OTHER PUBLICATIONS

Corti et al., Lithospheric-scale centrifuge models of pull-apart basins, Tectonophysics, 2015, pp. 154-163, vol. 664.
(Continued)

*Primary Examiner* — Jeffrey S Vanderveen

(57) ABSTRACT

A device for an analogue modeling experiment of a geological structure under a hypergravity field of a large-scale centrifuge is provided. A bottom plate is placed on a basket of the centrifuge and mounted with screw rod components; screw rods are arranged in parallel with the bottom plate; diverters, screw rod supporting columns, sliding guide rails and a motor are arranged on the bottom plate; output shafts at two ends of the motor are respectively connected to the two diverters; the diverters are connected with one end of the corresponding screw rod; a fixed baffle plate is connected with the screw rods and is embedded with the sliding guide rails; a detachable baffle plate is arranged at a lower part of the fixed baffle plate and has a lower part connected with a swing baffle plate through a hinge; and a curved table is arranged on the bottom plate.

6 Claims, 2 Drawing Sheets

(58) Field of Classification Search
CPC ... A63F 2009/2445; A63F 1/14; G01N 21/55; G01N 21/8914; G01N 2201/06113; G01N 2021/8917
See application file for complete search history.

(56) References Cited

FOREIGN PATENT DOCUMENTS

| | | | | |
|---|---|---|---|---|
| CN | 103234726 A | 8/2013 | | |
| CN | 103267625 A | 8/2013 | | |
| CN | 106205332 A | 12/2016 | | |
| CN | 107192570 A | 9/2017 | | |
| CN | 108444833 A | 8/2018 | | |
| CN | 109493705 A | 3/2019 | | |
| CN | 109509397 A | * 3/2019 | ............ | G06T 17/05 |
| CN | 109509397 A | 3/2019 | | |

OTHER PUBLICATIONS

Dixon et al., Recent developments in centrifuge modelling of tectonic processes: equipment, model construction techniques and rheology of model materials, Journal of Structural Geology, 1985, pp. 83-102, vol. 7, No. 1.
H. Ramberg, Model Experimentation of the Effect of Gravity on Tectonic Processes, Geophysical Journal of the Royal Astronomical Society, 1967, pp. 307-329, vol. 14.
Nobel et al., Structural evolution of fold-thrust structures in analog models deformed in a large geotechnical centrifuge. Journal of Structural Geology, 2011, pp. 62-77, vol. 33.
Gilles Peltzer, Centrifuged experrimiments of continental scale tectonics in Asia, Bull. Geol. Inst. Univ. Uppsala, 1988, pp. 115-128, vol. 14.

* cited by examiner

DEVICE FOR ANALOGUE MODELING EXPERIMENT OF GEOLOGICAL STRUCTURE UNDER HYPERGRAVITY FIELD OF LARGE-SCALE CENTRIFUGE

BACKGROUND OF THE PRESENT INVENTION

Field of Invention

The present invention relates to a device for an analogue modeling experiment of a geological structure, and more particularly to a device for an analogue modeling experiment of a geological structure under a hypergravity field of a large-scale centrifuge.

Description of Related Arts

For the geological structure deformation process with millions of years as the basic timing unit, people cannot directly observe the complete evolutionary history thereof. However, the structural model can reproduce the geological structure deformation process under the laboratory conditions with the acceptable duration, which is the effective way to know the structural deformation process and the mechanism thereof. Up to this day, the structural analogue modeling research method has a history of over two hundred years. Because the mathematic modeling method has not yet made the substantive breakthrough, the analogue modeling research method is still the most important method to research the structural deformation process and the mechanism thereof.

Because of the cost limits, at present, the structural analogue modeling is mainly carried out under the normal gravity condition. However, according to the similarity theory of the structural modeling, when using the reduced-time reduced-scale model to model the geological structure deformation process in the laboratory, besides adjusting the parameters of the modeling materials of the natural rock, the gravitational acceleration should also be increased in proportion. The inherent similarity defects of the normal-gravity structural modeling device causes this method has the great limitations in the modeling of the structural deformation process relating to the problems of rock flowage (such as upwelling of the mantle plume, convection of the asthenosphere, flowage of the lower crust, and the diapirism of the magma and the gypsum-salt layer).

It is well known that the modeling experiment carried out under the hypergravity condition generated by the centrifuge is the effective way to solve the above problem. Moreover, a lot of scholars have carried out the hypergravity structural analogue modeling research with the low-cost drum centrifuge all over the world. However, the method has the obvious deficiencies. Firstly, because of the short radius of the drum centrifuge, the radial gravitational acceleration has the relatively large change, which fails to provide a relatively uniform hypergravity environment for the model. Secondly, because of the small chamber space of the drum centrifuge, the model size is relatively small and the model resolution ratio is low. Thirdly, because the information collection device is difficult to be placed into the chamber of the drum centrifuge, it is failed to carry out the real-time observation of the experimentation process.

SUMMARY OF THE PRESENT INVENTION

In order to overcome deficiencies in prior art, an object of the present invention is to provide a device for an analogue modeling experiment of a geological structure under a hypergravity field of a large-scale centrifuge. Because a radius of the large-scale engineering centrifuge is much larger than a thickness of an experimental model, the hypergravity field where the model is located is relatively uniform. Moreover, because a basket space of the large-scale engineering centrifuge is relatively large, the geological model with the relatively large scale can be contained, and a model resolution ratio is obviously improved. Furthermore, the relatively wide basket space provides enough viewing range for collection of experimental results, which realizes information real-time collection during experimentation. Therefore, the device provided by the present invention is able to overcome the deficiencies of the conventional hypergravity analogue modeling experimental device.

Technical solutions of the present invention are described as follows.

A device for an analogue modeling experiment of a geological structure under a hypergravity field of a large-scale centrifuge comprises a bottom plate and a curved table, wherein: the bottom plate is placed on a basket of the centrifuge; two sides of the bottom plate are both mounted with a screw rod component; each screw rod component comprises a screw rod, a sliding guide rail, a diverter, and a screw rod supporting column; the screw rod is arranged in parallel with the bottom plate; two ends of the screw rod are respectively supported and connected between the diverter and the screw rod supporting column; the diverter and the screw rod supporting column are fixed on the bottom plate; the sliding guide rail is fixed on the bottom plate below the screw rod; a motor is fixed on the bottom plate between same ends of two screw rods; two ends of the motor are symmetrically equipped with output shafts; the output shafts at the two ends of the motor, through respective transmission shafts, are connected to one end of two diverters of two screw rod components; the other end of each diverter is connected with one end of the screw rod; a fixed baffle plate is connected between the two screw rods of the two screw rod components; two ends of the fixed baffle plate are respectively connected with the two screw rods through threaded connection, and bottoms of the two ends of the fixed baffle plate are embedded with two sliding guide rails; a detachable baffle plate is mounted at a lower part of the fixed baffle plate; a lower part of the detachable baffle plate is connected with a swing baffle plate through a hinge; the curved table is fixed on a middle of the bottom plate; an upper surface of the curved table is an arc-shaped cylindrical surface; a tangential direction of the arc-shaped cylindrical surface is parallel to the two screw rods, and a generatrix direction of the arc-shaped cylindrical surface is parallel to the fixed baffle plate; when the centrifuge rotates, motion tracks on the arc-shaped cylindrical surface of the curved table are all on a same cylindrical surface with a rotation shaft of the centrifuge as a center axis; the swing baffle plate is made of flexible material, and contacts the arc-shaped cylindrical surface of the curved table.

Preferably, when the centrifuge rotates, the center axis of the arc-shaped cylindrical surface is overlapped with the rotation shaft of the centrifuge.

Preferably, a curvature radius of the arc-shaped cylindrical surface is equal to a distance from the rotation shaft to a bottom surface of the bottom plate when the centrifuge rotates after subtracting a thickness of the bottom plate and a central thickness of the curved table.

Preferably, the bottom plate is made of steel material.

Preferably, the curved table is an experimental operation table; experimental materials and models are placed on the curved table; and the curved table is made of aluminum alloy material.

Preferably, the bottoms of the two ends of the fixed baffle plate are fixedly connected with two sliding blocks, and the sliding blocks are respectively embedded on the two sliding guide rails.

Preferably, a function of a power part is to provide power for the experiment.

Preferably, a function of the curved table is to provide an operation table for the experiment. The curved table is placed on the middle of the bottom plate; the upper surface of the curved table is the arc-shaped cylindrical surface, and other surfaces of the curved table are planes.

Preferably, a function of a baffle plate part is to transmit power of the power part to the experimental models, wherein: the two ends of the fixed baffle plate are penetrated and embedded with screw nuts, and coupled with the two screw rods; the detachable baffle plate is fixed on a middle of the fixed baffle plate, and the lower part of the detachable baffle plate is connected with the swing baffle plate through the hinge; the swing baffle plate contacts the upper surface of the curved table.

According to the present invention, the curved table with the upper surface of arc-shaped cylindrical surface and the baffle plate part can flexibly adjust and move are specially designed, so that fluid materials on the curved table are in the same equipotential surface of centrifugal force, which avoids flowing of non-experimental reason and eliminates modeling errors of prior art.

The present invention has beneficial effects as follows.

Firstly, the device can carry out the analogue modeling experiment of the geological structure inside the large-scale centrifuge, so that the hypergravity analogue modeling researches of the geological structure phenomenon is realized and the analogue modeling of the geological structure becomes more accurate.

Secondly, the arc-shaped cylindrical surface of the curved table guarantees that the experimental models placed thereon are in the same equipotential surface of gravity, so as to effectively avoid flowing of the fluid experimental materials due to the non-experimental reason.

Thirdly, the whole device has the relatively large rigidity and is difficult to be deformed, effectively guaranteeing that the device can normally work under the hypergravity condition.

Fourthly, the detachable baffle plate is connected with the swing baffle plate through the hinge, guaranteeing that the swing baffle plate can freely swing with the undulation of the curved table, so that the swing baffle plate closely contacts the curved table during the whole experimentation process.

Fifthly, the motor and the transmission shafts are distributed at the short side of the bottom plate, and the screw rods are distributed at the two long sides of the bottom plate, so that space is left for the curved table while ensuring the power transmission, which saves the effective space of the basket of the centrifuge to the maximum extent.

In figures: 1: bottom plate; 2: curved table; 3: motor; 4: transmission shaft; 5: diverter; 6: screw rod; 7: screw rod supporting column; 8: sliding guide rail; 9: fixed baffle plate; 10: sliding block; 11: detachable baffle plate; 12: hinge; and 13: swing baffle plate.

DETAILED DESCRIPTION OF THE
PREFERRED EMBODIMENT

The present invention is further described in detail with the accompanying drawings and the preferred embodiment.

Figure 1:
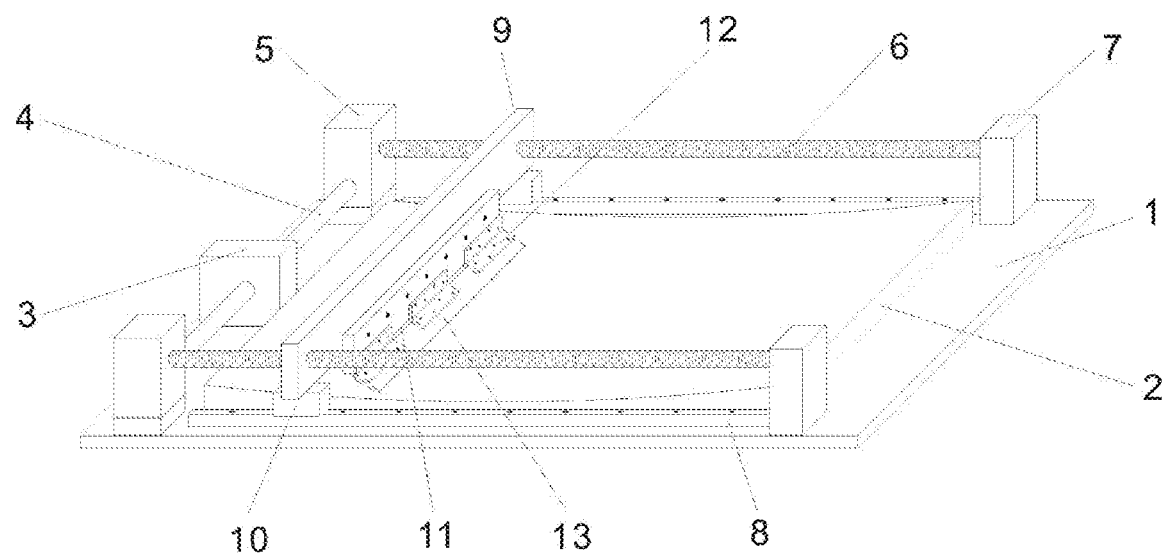
FIG. 1 is an overall structural sketch view of a device for an analogue modeling experiment of a geological structure according to a preferred embodiment of the present invention.

As shown in FIG. 1, according to the preferred embodiment of the present invention, a device for an analogue modeling experiment of a geological structure under a hypergravity field of a large-scale centrifuge comprises a bottom plate 1, a curved table 2, a power part and a baffle plate part.

As shown in FIG. 1, the bottom plate 1 is arranged on a basket of the centrifuge; two sides of the bottom plate 1 are both mounted with a screw rod component; each screw rod component comprises a screw rod 6, a sliding guide rail 8, a diverter 5, and a screw rod supporting column 7; the screw rod 6 is arranged in parallel with the bottom plate 1; two ends of the screw rod 6 are respectively supported and connected between the diverter 5 and the screw rod supporting column 7; the diverter 5 and the screw rod supporting column 7 are fixed on the bottom plate 1; the sliding guide rail 8 is fixed on the bottom plate 1 below the screw rod 6; a motor 3 is fixed on the bottom plate 1 between same ends of two screw rods 6; two ends of the motor 3 are symmetrically equipped with output shafts; the output shafts at the two ends of the motor 3, through respective transmission shafts 4, are connected to one end of two diverters 5 of two screw rod components; the other end of each diverter 5 is connected with one end of the screw rod 6; the two ends of each diverter 5 are respectively located at two vertical sides; on each diverter 5, a direction of the transmission shaft 4 is perpendicular to a direction of the screw rod 6; the other end of the screw rod 6 is connected with the screw rod supporting column 7; the screw rod supporting column 7 is for fixing and supporting the screw rod 6; the motor 3, the transmission shafts 4, and the screw rod components constitute the power part, and the motor 3 of the power part is a power source.

Figure 2:
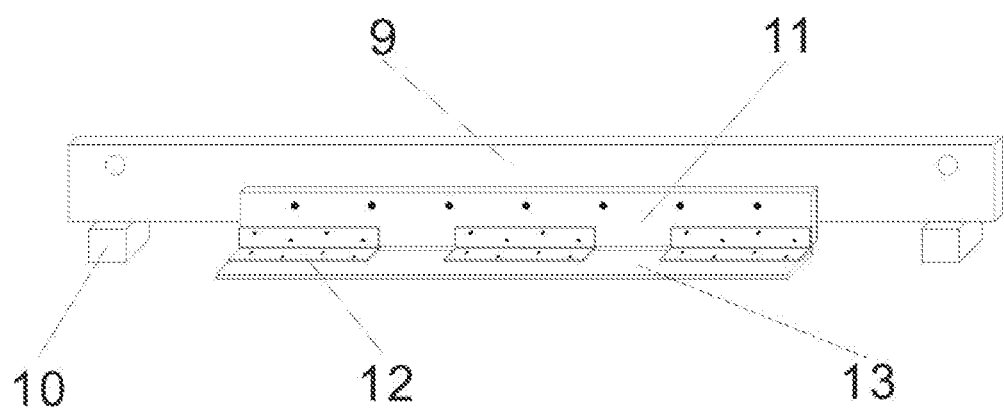
FIG. 2 is a structural sketch view of a baffle plate part according to the preferred embodiment of the present invention.

As shown in FIG. 2, a fixed baffle plate 9 is connected between the two screw rods 6 of the two screw rod components; the fixed baffle plate 9 is parallel to the output shafts of the motor 3 and the transmission shafts 4; two ends of the fixed baffle plate 9 are respectively connected with the two screw rods 6 through threaded connection, and bottoms of the two ends of the fixed baffle plate 9 are embedded with two sliding guide rails 8; a detachable baffle plate 11 is mounted at a lower part of the fixed baffle plate 9; a lower part of the detachable baffle plate 11 is connected with a swing baffle plate 13 through a hinge 12; the fixed baffle plate 9, the detachable baffle plate 11, the hinge 12, and the swing baffle plate 13 constitute the baffle plate part.

Figure 3:
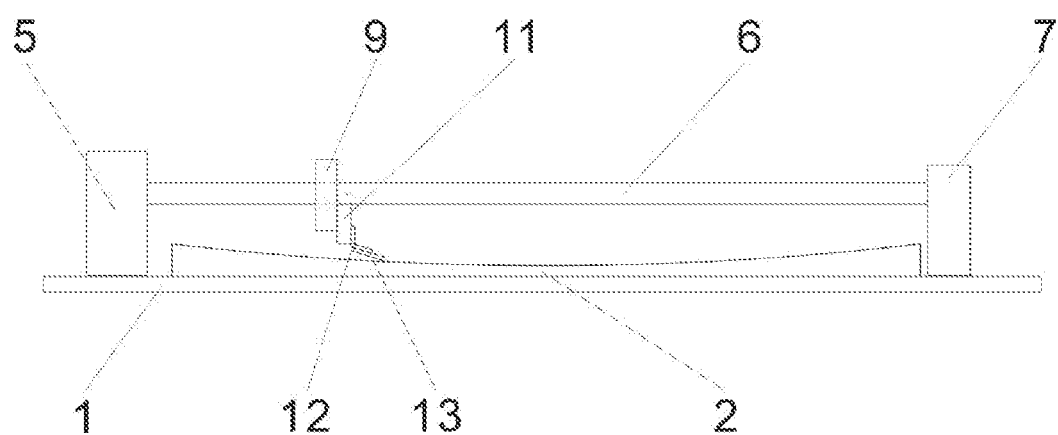
FIG. 3 is a sectional view about a contact relationship among baffle plates and a curved table according to the preferred embodiment of the present invention.

The curved table 2 is fixed on a middle of the bottom plate 1; an upper surface of the curved table 2 is an arc-shaped cylindrical surface; a tangential direction of the arc-shaped cylindrical surface is parallel to the two screw rods 6, and a generatrix direction (axial direction) of the arc-shaped cylindrical surface is parallel to the fixed baffle plate 9; a hinged shaft between the basket of the centrifuge and the bottom plate 1 is parallel to the bottom plate 1, but perpendicular to the axial direction of the arc-shaped cylindrical surface, so that motion tracks on the arc-shaped cylindrical surface of the curved table 2 are all on a same cylindrical surface with a rotation shaft of the centrifuge as a center axis when the centrifuge rotates; when the centrifuge rotates, the center axis of the arc-shaped cylindrical surface is overlapped with the rotation shaft of the centrifuge. As shown in FIG. 3, the swing baffle plate 13 is made of flexible material, and contacts the arc-shaped cylindrical surface of the curved table 2.

A curvature radius of the arc-shaped cylindrical surface is equal to a distance from the rotation shaft to a bottom surface of the bottom plate 1 when the centrifuge rotates (namely an effective radius of the large-scale centrifuge) after subtracting a thickness of the bottom plate 1 and a central thickness of the curved table 2. Therefore, when the large-scale centrifuge works, it is guaranteed that the upper surface of the curved table 2 completely fits the equipotential surface of centrifugal force herein. As shown in FIG. 3, flowing of non-experimental reason, caused due to the experimental materials (especially fluid materials) placed on the curved table 2 not in the same equipotential surface of centrifugal force, is avoided.

In order to ensure strength, the bottom plate 1 is made of steel material.

As shown in FIG. 1, the curved table 2 is an experimental operation table; experimental materials and models are placed on the curved table 2; in order to ensure strength and quality, the curved table 2 is made of aluminum alloy material.

As shown in FIG. 1, the diverter 5 diverts a transmission direction of the transmission shaft 4 and transmits to the screw rod 6. Because the fixed baffle plate 9 is coupled with a pair of screw rods 6 through screw nuts, when the screw rods 6 rotate, the fixed baffle plate 9 is driven to translate along the screw rods 6 through the screw nuts.

As shown in FIG. 1 and FIG. 2, the screw nuts are respectively embedded in the two ends of the fixed baffle plate 9, so that the two ends of the fixed baffle plate 9 are coupled with the two screw rods 6. The bottoms of the two ends of the fixed baffle plate 9 are fixed with two sliding blocks 10, and the sliding blocks 10 are respectively embedded with the two sliding guide rails 8, so that the sliding blocks 10 can not only support the fixed baffle plate 9, but also connect the fixed baffle plate 9 to the sliding guide rails 8, guaranteeing that the fixed baffle plate 9 can translate along the screw rods 6. The detachable baffle plate 11 is fixed at a middle of the fixed baffle plate 9 through a screw, and the lower part of the detachable baffle plate 11 is connected with the swing baffle plate 13 through the hinge 12, so as to guarantee that the swing baffle plate 13 can flip and swing with a rotation shaft of the hinge 12 as the center.

As shown in FIG. 1 and FIG. 3, a lower part of the swing baffle plate 13 contacts the upper surface of the curved table 2; when the fixed baffle plate 9 translates, because the swing baffle plate 13 can swing upward and downward along the hinge 12, under the effect of gravity, no matter the fixed baffle plate 9 translates to any position, the swing baffle plate 13 can always keep the contact relationship with the upper surface of the curved table 2.

During implementation, the fixed baffle plate 9 is translated to an ideal position, and then the experimental models and the required experimental materials are placed on the curved table 2. The whole device is hoisted and loaded into the basket of the large-scale centrifuge with the hoist, and the necessary lines are connected, so that the preparation work is completed. The large-scale centrifuge is started; after the centrifuge is accelerated to a preset accelerated velocity, the motor 3 is started according to experimental requirements and drives the fixed baffle plate 9 to translate a specific distance in the specific velocity, and the swing baffle plate 13 moves the same distance in the same velocity and facilitates the experimental models and materials on the upper surface of the curved table 2 to deform, so as to generate the experimental phenomenon. Until the experiment ends, the whole device is unloaded from the basket.

During experimentation, data processing of the hypergravity geological structure analogue modeling experiment comprises steps of:
   (1) conducting two-dimensional shooting and three-dimensional elevation scanning with the specially designed hypergravity geological structure analogue modeling experimental device having the curved model surface, and collecting initial elevation data and initial velocity field data; wherein:
   during implementation, deformation materials generally adopt the experimental materials having different deformation characteristics, such as quartz sand, micro glass beads, and silica gel;
   when the centrifuge rotates, the center axis of the arc-shaped cylindrical surface is overlapped with the rotation shaft of the centrifuge;
   (2) correcting the initial elevation data and the initial velocity field data, and obtaining corrected elevation data and velocity field data.

In the step (2), for the initial elevation data collected by the hypergravity geological structure analogue modeling experiment, a three-dimensional coordinate system is established; each elevation point in the initial elevation data all has initial two-dimensional plane coordinates and initial three-dimensional elevation, and the elevation points are position points in the elevation data. Correction of each elevation point is described as follows.

Processing of the elevation data means the processing to the two-dimensional plane coordinates and the three-dimensional elevation of all the elevation points, comprising four steps of:
   (a1) according to the initial two-dimensional plane coordinates and the initial three-dimensional elevation of each elevation point, calculating a plane coordinate deviation of each elevation point caused by undulation of the curved model surface;
   (a2) according to the initial two-dimensional plane coordinates and the plane coordinate deviation obtained through the step (a1) of each elevation point, calculating two-dimensional plane coordinates of an orthographic point corresponding to each elevation point, so as to realize orthographic correction of the two-dimensional plane coordinates of each elevation point;
   (a3) according to the two-dimensional plane coordinates of the corresponding orthographic point obtained through the step (a2) and the known surface arc equation and arc length formula of the upper surface of the curved table, calculating corrected two-dimensional plane coordinates and elevation projection difference of each elevation point, so as to realize projection transformation of the two-dimensional plane coordinates of each elevation point;
   (a4) according to the initial three-dimensional elevation and the elevation projection difference calculated through the step (a3) of each elevation point, calculating corrected three-dimensional elevation of each elevation point, so as to realize projection transformation of the three-dimensional elevation of each elevation point; and finally, integrating the corrected two-dimensional plane coordinates and three-dimensional elevation of each elevation point into corrected elevation data of each elevation point.

The corrected two-dimensional plane coordinates and three-dimensional elevation of each elevation point are calculated through formulas of:

$$\begin{cases} x_f = R \arcsin \dfrac{Q(x, z)}{R} \\ y_f = y \\ z_f = z - R + \sqrt{R^2 - [Q(x, z)]^2} \end{cases}$$

$$Q(x, z) = \dfrac{x^3 + x(R-z)\sqrt{R^2 - x^2}}{x^2 + (R-z)^2}$$

wherein: x and v represent the initial two-dimensional plane coordinates of the elevation point; z represents the initial three-dimensional elevation of the elevation point; $x_f$ and $y_f$ represent the corrected two-dimensional plane coordinates of the elevation point; $z_f$ represents the corrected three-dimensional elevation of the elevation point; Q(x,z) represents the X coordinate of the orthographic point corresponding to the elevation point represented with x and z; R represents the curvature radius of the arc-shaped cylindrical surface of the curved table.

In the step (2), for the initial velocity field data collected by the hypergravity geological structure analogue modeling experiment, a two-dimensional coordinate system is established, and two-dimensional plane coordinates are given to each feature point; according to the calculation principle of PIV (Particle Image Velocimetry), it can be known that the velocity field is obtained through dividing the relative displacement of the corresponding feature points in two photos having the certain time interval by the time interval; each feature point in the initial velocity field data all has two-dimensional plane coordinates of a start point where a time step begins and a displacement distance from the start point to the end point within the time step; the feature points are position points in the initial velocity field data. Correction of each feature point is described as follows, and the whole correction process comprises five steps of:

(b1) according to the two-dimensional plane coordinates of the start point and the displacement distance of each feature point, calculating two-dimensional plane coordinates of the end point of each feature point;

(b2) according to the two-dimensional plane coordinates of the start point, the two-dimensional plane coordinates of the end point, and the three-dimensional elevation of the start point and the end point of each feature point, respectively calculating plane coordinate deviations of the start point and the end point caused by the undulation of the curved model surface;

(b3) according to the two-dimensional plane coordinates of the start point and the end point, and the respective plane coordinate deviations of the start point and the end point calculated through the step (b2), calculating two-dimensional plane coordinates of orthographic points respectively corresponding to the start point and the end point, so as to realize orthographic correction of the two-dimensional plane coordinates of the start point and the end point;

(b4) according to the two-dimensional plane coordinates of the orthographic points respectively corresponding to the start point and the end point, calculated through the step (b3), and the known surface arc equation and arc length formula of the upper surface of the curved table, respectively calculating corrected two-dimensional plane coordinates of the start point and the end point, so as to realize projection transformation of the two-dimensional plane coordinates of the start point and the end point;

(b5) according to the corrected two-dimensional plane coordinates of the start point and the end point, calculating a corrected displacement distance of each feature point; and finally, integrating the corrected two-dimensional plane coordinates of the start point and the corrected displacement distance of each feature point into the corrected velocity field data of each feature point.

In the step (b2), both of the three-dimensional elevation of the start point and the end point adopt the initial three-dimensional elevation of the two points in the elevation data.

The corrected two-dimensional plane coordinates and displacement distances along two directions of the two-dimensional plane coordinates of each feature point are calculated through formulas of:

$$\begin{cases} x_f = R \arcsin \dfrac{Q(x, z)}{R} \\ y_f = y \\ d_{xf} = R \left[ \arcsin \dfrac{Q(x+d_x, z')}{R} - \arcsin \dfrac{Q(x, z)}{R} \right] \\ d_{yf} = d_y \end{cases}$$

$$Q(x, z) = \dfrac{x^3 + x(R-z)\sqrt{R^2 - x^2}}{x^2 + (R-z)^2}$$

$$Q(x+d_x, z') = \dfrac{(x+d_x)^3 + (x+d_x)(R-z')\sqrt{R^2 - (x+d_x)^2}}{(x+d_x)^2 + (R-z')^2}$$

wherein: x and y represent the initial two-dimensional plane coordinates of the feature point; z represents the initial three-dimensional elevation of the feature point; z' represents the initial three-dimensional elevation of the end point of the feature point; $x_f$ and $y_f$ represent the corrected two-dimensional plane coordinates of the feature point; $d_{xf}$ and $d_{yf}$ represent the corrected displacement distances along the two directions of the two-dimensional plane coordinates of the feature point; Q (x,z) represents the X coordinate of the orthographic point corresponding to the feature point represented with x and Z; Q (x+$d_x$, z') represents the X coordinate of the orthographic point corresponding to the end point represented with x+$d_x$ and z' of the feature point; R represents the curvature radius of the arc-shaped cylindrical surface of the curved table.

It can be seen that: the present invention not only provides the uniform hypergravity field for the experimental models and materials, but also greatly expands the experimental model scale and improves the model resolution ratio. Cooperated with the advantage of relatively large basket space of the large-scale centrifuge, convenience is provided for the real-time collection of the experimental data. Thus, on the basis of the realization of carrying out the analogue modeling experiment of the geological structure with the large-scale centrifuge, the present invention also has the above technical advantages, having the obvious technical effects.

What is claimed is:

1. A device for an analogue modeling experiment of a geological structure under a hypergravity field of a large-scale centrifuge, comprising a bottom plate (1) and a curved table (2), wherein: the bottom plate (1) is placed on a basket of the centrifuge; two sides of the bottom plate (1) are both mounted with a screw rod component; each screw rod component comprises a screw rod (6), a sliding guide rail (8), a diverter (5), and a screw rod supporting column (7); the screw rod (6) is arranged in parallel with the bottom plate (1); two ends of the screw rod (6) are respectively supported and connected between the diverter (5) and the screw rod supporting column (7); the diverter (5) and the screw rod supporting column (7) are fixed on the bottom plate (1); the sliding guide rail (8) is fixed on the bottom plate (1) below the screw rod (6); a motor (3) is fixed on the bottom plate (1) between same ends of two screw rods (6); two ends of the motor (3) are symmetrically equipped with output shafts; the output shafts at the two ends of the motor (3), through respective transmission shafts (4), are connected to one end of two diverters (5) of two screw rod components; the other end of each diverter (5) is connected with one end of the screw rod (6); a fixed baffle plate (9) is connected between the two screw rods (6) of the two screw rod components; two ends of the fixed baffle plate (9) are respectively connected with the two screw rods (6) through threaded connection, and bottoms of the two ends of the fixed baffle plate (9) are embedded with two sliding guide rails (8); a detachable baffle plate (11) is mounted at a lower part of the fixed baffle plate (9); a lower part of the detachable baffle plate (11) is connected with a swing baffle plate (13) through a hinge (12); the curved table (2) is fixed on a middle of the bottom plate (1); an upper surface of the curved table (2) is an arc-shaped cylindrical surface; a tangential direction of the arc-shaped cylindrical surface is parallel to the two screw rods (6), and a generatrix direction of the arc-shaped cylindrical surface is parallel to the fixed baffle plate (9); when the centrifuge rotates, motion tracks on the arc-shaped cylindrical surface of the curved table (2) are all on a same cylindrical surface with a rotation shaft of the centrifuge as a center axis; the swing baffle plate (13) is made of flexible material, and contacts the arc-shaped cylindrical surface of the curved table (2).

2. The device, as recited in claim 1, wherein: when the centrifuge rotates, the center axis of the arc-shaped cylindrical surface is overlapped with the rotation shaft of the centrifuge.

3. The device, as recited in claim 1, wherein: a curvature radius of the arc-shaped cylindrical surface is equal to a distance from the rotation shaft to a bottom surface of the bottom plate (1) when the centrifuge rotates after subtracting a thickness of the bottom plate (1) and a central thickness of the curved table (2).

4. The device, as recited in claim 1, wherein the bottom plate (1) is made of steel material.

5. The device, as recited in claim 1, wherein: the curved table (2) is an experimental operation table; experimental materials and models are placed on the curved table (2); and the curved table (2) is made of aluminum alloy material.

6. The device, as recited in claim 1, wherein: the bottoms of the two ends of the fixed baffle plate (9) are fixedly connected with two sliding blocks (10), and the sliding blocks (10) are respectively embedded on the two sliding guide rails (8).

* * * * *